(12) United States Patent
Courtright

(10) Patent No.: US 11,538,014 B1
(45) Date of Patent: *Dec. 27, 2022

(54) SYSTEMS AND METHODS FOR TRANSACTIONS USING AN ATM/CREDIT/DEBIT CARD AND A SECOND COMMUNICATIONS CHANNEL TO AN ACCOUNT HOLDER'S BANK

(71) Applicant: United Services Automobile Association (USAA), San Antonio, TX (US)

(72) Inventor: Christopher Paul Courtright, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 191 days.

This patent is subject to a terminal disclaimer.

(21) Appl. No.: 17/096,646

(22) Filed: Nov. 12, 2020

Related U.S. Application Data

(63) Continuation of application No. 15/629,515, filed on Jun. 21, 2017, now Pat. No. 10,853,785, which is a
(Continued)

(51) Int. Cl.
*G06Q 20/22* (2012.01)
*G06Q 20/10* (2012.01)
(Continued)

(52) U.S. Cl.
CPC ..... *G06Q 20/2295* (2020.05); *G06Q 20/1085* (2013.01); *G06Q 20/204* (2013.01); *G06Q 20/206* (2013.01); *G06Q 20/3572* (2013.01)

(58) Field of Classification Search
None
See application file for complete search history.

(56) References Cited

U.S. PATENT DOCUMENTS 7,249,092 B2 7/2007 Dunn et al.
7,707,108 B2 4/2010 Brown et al.
(Continued)

OTHER PUBLICATIONS

Schuddekopf et al., "Hypercom Creates Fully Integrated Contactless Payment Terminal Supporting Mastercard PayPass", Smart Card Alliance, 2 pages.

*Primary Examiner* — Scott A Zare
(74) *Attorney, Agent, or Firm* — Fish & Richardson P.C.

(57) ABSTRACT

Systems and methods for performing a transaction with a headless point-of-sale or automated teller machine (ATM) device are disclosed using a card having a second communications path to a financial services provider. A card having a display and radio frequency (RF) communications module may be authenticated with a headless point-of-sale device using a short-range RF communications link. Characteristics of the card may be set prior to the transaction. Transaction information may be provided to the display of the card from the headless point-of-sale device. A customer may confirm the transaction at the card using a touch-sensitive input area. During the processing, a communication may be made over the second communications path to authorize the transaction independently of the transaction processing path. A transaction may then be completed at the headless point-of-sale device.

19 Claims, 9 Drawing Sheets

Related U.S. Application Data continuation of application No. 12/504,783, filed on Jul. 17, 2009, now Pat. No. 9,691,059.

(51) Int. Cl.
  *G06Q 20/20* (2012.01)
  *G06Q 20/34* (2012.01)

(56) References Cited

U.S. PATENT DOCUMENTS

| | | | |
|---|---|---|---|
| 8,127,982 B1* | 3/2012 | Casey | G06Q 40/02 |
| | | | 235/382.5 |
| 9,684,899 B1* | 6/2017 | Mohsenzadeh | G06Q 20/12 |
| 10,853,785 B1* | 12/2020 | Courtright | G06Q 20/204 |
| 2002/0023122 A1 | 2/2002 | Polizzi et al. | |
| 2003/0178482 A1 | 9/2003 | Kisliakov | |
| 2004/0039694 A1* | 2/2004 | Dunn | G06Q 20/20 |
| | | | 705/39 |
| 2004/0124966 A1* | 7/2004 | Forrest | G07F 7/125 |
| | | | 340/5.41 |
| 2006/0091223 A1 | 5/2006 | Zellner et al. | |
| 2006/0246871 A1 | 11/2006 | Takeshita et al. | |
| 2006/0266822 A1 | 11/2006 | Kelley et al. | |
| 2008/0059375 A1 | 3/2008 | Abifaker | |
| 2009/0063312 A1* | 3/2009 | Hurst | G06Q 20/40 |
| | | | 705/41 |
| 2009/0063340 A1 | 3/2009 | Chiang | |
| 2009/0112768 A1 | 4/2009 | Hammad et al. | |
| 2010/0114724 A1 | 5/2010 | Ghosh et al. | |
| 2011/0295747 A1 | 12/2011 | De Tortelli | |
| 2013/0124351 A1* | 5/2013 | Fisher | G06Q 20/3226 |
| | | | 705/21 |

\* cited by examiner

US 11,538,014 B1

SYSTEMS AND METHODS FOR TRANSACTIONS USING AN ATM/CREDIT/DEBIT CARD AND A SECOND COMMUNICATIONS CHANNEL TO AN ACCOUNT HOLDER'S BANK

CROSS-REFERENCE TO RELATED APPLICATIONS

This application is a continuation application of and claims priority under 35 U.S.C. § 120 to U.S. application Ser. No. 15/629,515, filed on Jun. 21, 2017, which in turn is a continuation application of and claims priority under 35 U.S.C. § 120 to U.S. application Ser. No. 12/504,783, filed on Jul. 17, 2009, now U.S. Pat. No. 9,691,059, the entire contents of each of which are incorporated herein by reference.

BACKGROUND

The process by which customers have made purchases or withdrawals currency from point-of-sale (POS) devices and automated teller machines (ATM) has remained the same for a considerably long time. The user first approaches the POS/ATM, insert or swipes his/her card into the card reader, enters a PIN number in accordance with a transaction type, responds to the prompts on the screen, and makes a payment or receives currency and a receipt. However, conventional cards provide little or no configurable parameters to adjust to the specifics of a transaction. As such, a conventional credit/debit card may be used to make purchases without regard to the merchant where the purchase is being made, the location of the merchant, etc. Similarly, a conventional credit/debit card may be used by one joint account holder without the knowledge or approval of another joint accounts holder. Thus, conventional credit/debit/ATM cards may not be suitable for certain transaction types under certain conditions.

SUMMARY

Systems and methods for performing a transaction with a headless point-of-sale or automated teller machine (ATM) device are disclosed using a card having a second communications path to a financial services provider. A card having a display and radio frequency (RF) communications module may be authenticated with a headless point-of-sale device using a short-range RF communications link. Transaction information may be provided to the display of the card from the headless point-of-sale device. A customer may confirm the transaction at the card using a touch-sensitive input area. The headless point-of-sale device may then provide the transaction information to a transaction processor for processing and verification. During the processing, a communication may be made over the second communications path to authorize the transaction independently of the transaction processing path. A transaction may then be completed at the headless point-of-sale device.

In some implementations, where the headless device is a headless ATM, the card may be authenticated to the ATM. Transaction information may be entered and displayed on the card. A communication may be made over the second communications path to authorize the card transaction with the headless ATM independently of the ATM transaction processing path. A cardholder may authenticate with the ATM by entering, e.g., a PIN number and funds may be dispensed to the cardholder upon verification of the PIN.

This summary is provided to introduce a selection of concepts in a simplified form that are further described in the detailed description section. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
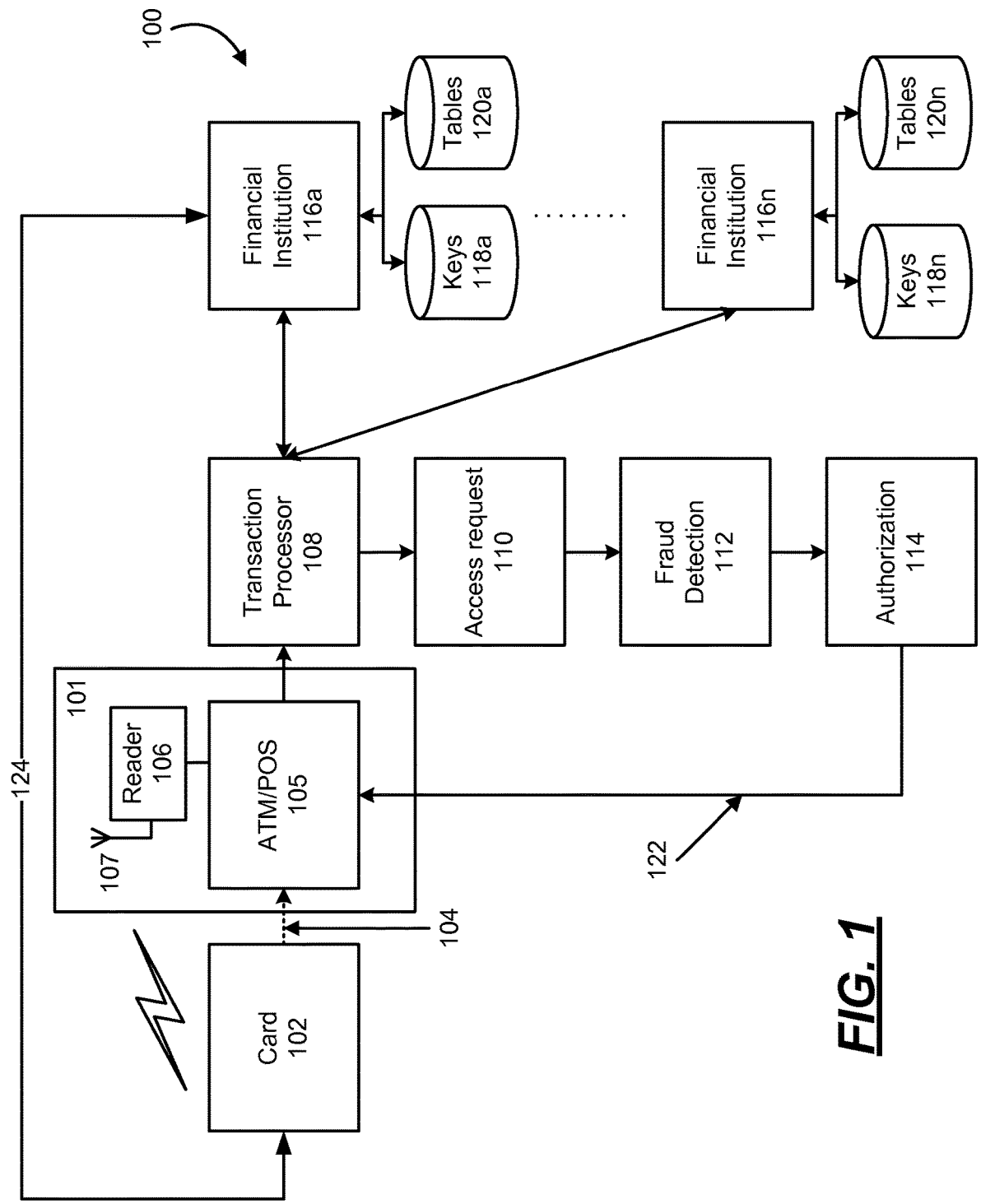
FIG. 1 illustrates an example financial transaction system.

FIG. 1 illustrates an example financial transaction system 100. A population of user cards is represented herein by cards 102. The cards 102 may be configured as credit cards, debit cards, gift cards, loyalty cards, ATM cards, and other types in these general formats, as described below. Each card 102 may include a magnetic stripe that includes tracks 1, 2 and/or 3. The magnetic stripe may include a primary account number (PAN), a name, an expiration date, a service code, discretionary data (e.g., a Pin Verification Key Indicator (PVKI), Pin Verification Value (PVV), Card Verification Value or Card Verification Code (CVV, CVK, CVC1, CVV1), a Longitudinal redundancy check (LRC), etc. In a typical 16-digit credit/debit card personal account number (PAN) [XXXX XXXX XXXX XXXX], the first digit is a card system identifier (VISA/MC/AMEX), the next 5-digits are a bank identification number (BIN), the next 9-digits are the customer user account number, and the longitudinal redundancy check character (LRC).

The card 102 may be a contactless smart card that includes embedded integrated circuits such that the card 102 may communicate with a card reader 106 through RFID induction technology. As such, the card 102 need only be in close proximity to an antenna 107 to complete a transaction with an automated teller machine/point-of-sale device (ATM/POS) 105. The standard for contactless smart card communications is ISO/IEC 14443, which defines two types of contactless cards ("A" and "B"), that allows for communications at distances up to 10 cm. In some implementations, the card 102 may use a built-in inductor to capture some of the incident radio-frequency interrogation signal, rectify it, and use it to power the card's electronics. The card 102 may also include a user interface through which information may be presented to, or received from, a user. A more detailed description of the contactless card is provided with reference to FIG. 2.

The card 102 may also be used as an electronic wallet. The integrated circuits in the card 102 may be loaded with funds, which can be spent in parking meters, vending machines, merchants, etc. Cryptographic protocols protect the exchange of money between the smart card and the accepting machine. No connection to an issuing bank is necessary in such a configuration, so the holder of the card can use it regardless of the holder being the owner of the card and/or account associated with the card.

A merchant 101 may have the ATM/POS device 105 at a location that may be configured as "headless" device (i.e., no display). The ATM/POS 105 may include a CPU to control transaction devices, a magnetic and/or chip card reader to identify the customer, a secure cryptoprocessor, and, optionally, a printer to provide the customer with a record of their transaction. In some implementations, the ATM/POS 105 may lack a physical input device (e.g., a keypad) and rely solely on the card 102 to send and receive information to the user. Many ATMs include an architecture similar to a general purpose computing device, as described with reference to FIG. 10. For example, many ATMs/POS devices use operating systems such as MICROSOFT WINDOWS and LINUX.

In some implementations, the ATM/POS 105 may include, or be operably connected to, the reader 106 that may have the RF antenna 107 in some implementations. The reader 106 provides an interrogation signal for powering the card 102 when the card 102 is positioned in proximity to the reader 106. The interrogating signal may power the card 102 thereby initiating operation of the card 102 to perform a transaction.

In some implementations, the reader 106 may be a more general purpose wireless communication system. In such implementations, the reader 106 may be configured to communicate with devices using such protocols and standards as IEEE 802.11x, Bluetooth, IEEE 802.16, among others. As such, the reader 106 may communicate with wireless devices such as handsets, laptop personal computing devices and other mobile computing devices, etc.

In some implementations, the reader 106 may be a contact plate on which the card 102 is placed to power the card 102 to perform a transaction. In some implementations, the reader 106 and ATM/POS 105 may be a surface computing device, such as MICROSOFT SURFACE. The card 102 may communicate with the reader 106 by placing it on a surface to active the card's electronics.

As part of the transaction process, the ATM/POS 105 may read magnetic swipe data 104 that may include, a user identification ISO/IEC and/or Track 1/2/3 data. In some implementations, the above information may be received from the card 102 or other handheld wireless device using the reader 106. The information may be communicated together with other details of the transaction (e.g., an amount, type of transaction, merchant/bank ID, etc.) to a transaction processor 108 to authenticate the user account and approve the transaction.

The transaction processor 108 includes an account access request process 110, a fraud detection process 112, and an authorization process 114. These may also be used to administer inter-partner data exchanges, such as when transaction data and requests are bridged bi-directionally between the payment infrastructure (e.g., the ATM/POS 105) and one or more financial institutions 116a . . . 116n.

Each financial institution 116a . . . 116n that provides cards 102 may maintain a respective customer database 118a . . . 118n containing information for each customer such as a residence/mailing address (street, city, state and ZIP code), contact information (telephone, e-mail, etc.), social security number, and security information (a secret password or passphrase, answer(s) to security question(s)). Each financial institution 116a . . . 116n may maintain a respective ledger balance 120a . . . 120n to track transactions and balances for each customer account to determine an amount of funds on deposit, loan balances, etc.

The financial institutions 116a . . . 116n may authenticate the user based on information contained in the message 104 and information contained in the customer databases 118a . . . 118n and ledger balances 120a . . . 120n. If the transaction is approved, an authorization code 122 is returned to the ATM/POS 105 by the payment processor authorization process 114 to enable the user to perform a transaction on the ATM/POS 105. Thus, in the system 100, transactions made at the ATM/POS 105 may be processed as ATM transactions.

Figure 2:
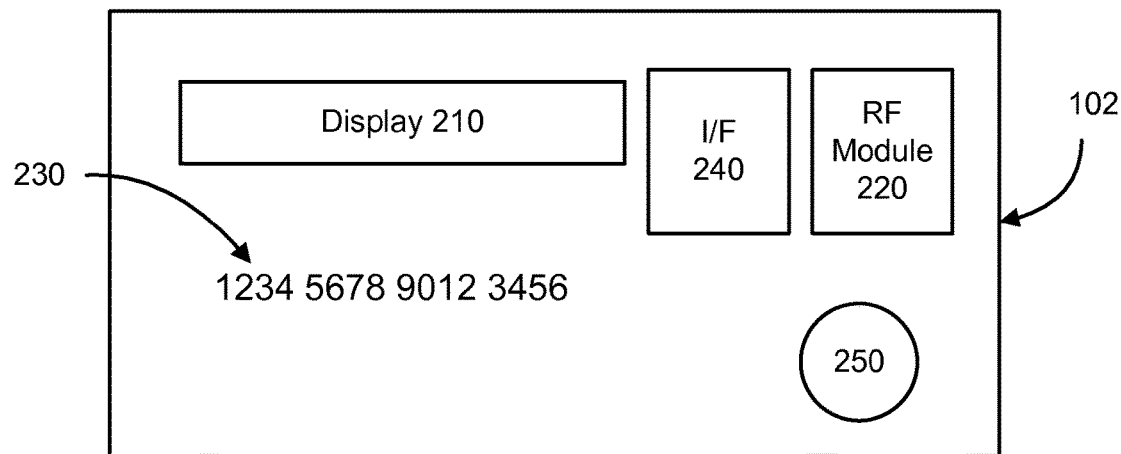
FIG. 2 depicts the front surface of an exemplary contactless card in accordance with implementations herein.

FIG. 2 depicts the front surface of an exemplary contactless card in accordance with implementations herein. The card 102 may have any shape and may be formed having a size similar to a credit card (i.e., as set in ISO/IEC 7810, which defines the dimensions as 85.60×53.98 mm), a SIM card (i.e., ID-000 which is 25×15 mm), or as a key fob having varying dimensions. The card 102 may include a display area 210, an RF module 220 for conducting a RF transaction, an embossed card number 230, a network interface 240, a battery 250, and a magnetic stripe on the back (not shown).

The display area 210 may be a touch-sensitive display to receive inputs from a user and to display information to the user. The touch-sensitive display may be one or a combination of the following types: resistive, capacitive, dispersive signal, acoustic pulse, electronic ink (e-ink), etc. The display area 210 may be rendered operational when placed into communication with the ATM/POS 105. A resistive display may include a panel that is covered with a conductive and a resistive metallic layer. The two layers are held apart by spacers, and a scratch-resistant layer is placed on top. An electrical current may runs through the two layers while the display area 210 is operational. When a user touches the screen, the two layers make contact in that exact spot. The change in the electrical field is noted and the coordinates of the point of contact are calculated. Once the coordinates are known, a driver 320 (see, FIG. 3) translates the touch into something that the card 102 understands as a position.

In the capacitive system, a layer that stores electrical charge is placed on the display area 210. When a user touches the display area 210 with his or her finger, some of the charge is transferred to the user, so the charge on the capacitive layer decreases. This decrease is measured in circuits located at each corner of the display area 210. From the relative differences in charge at each corner, the card 102 may calculate exactly where the touch event took place and then relays that information to the driver.

In an acoustic pulse system, two transducers (one receiving and one sending) are placed along the x and y axes of the display area 210. Also placed on the display area 210 are reflectors that reflect an electrical signal sent from one transducer to the other. The receiving transducer is able to tell if the wave has been disturbed by a touch event at any instant, and can locate it accordingly.

Electronic ink displays utilize microcapsules, each of which contains positively charged white particles and negatively charged black particles suspended in a clear fluid. When a negative electric field is applied, the white particles move to the top of the microcapsule where they become visible to the user. This makes the surface appear white at that spot. At the same time, an opposite electric field pulls the black particles to the bottom of the microcapsules where they are hidden. By reversing this process, the black particles appear at the top of the capsule, which now makes the surface appear dark at that spot. To form an e-ink electronic display, the ink is printed onto a sheet of plastic film that is laminated to a layer of circuitry. The circuitry forms a pattern of pixels that can then be controlled by the display driver 320.

Figure 3:
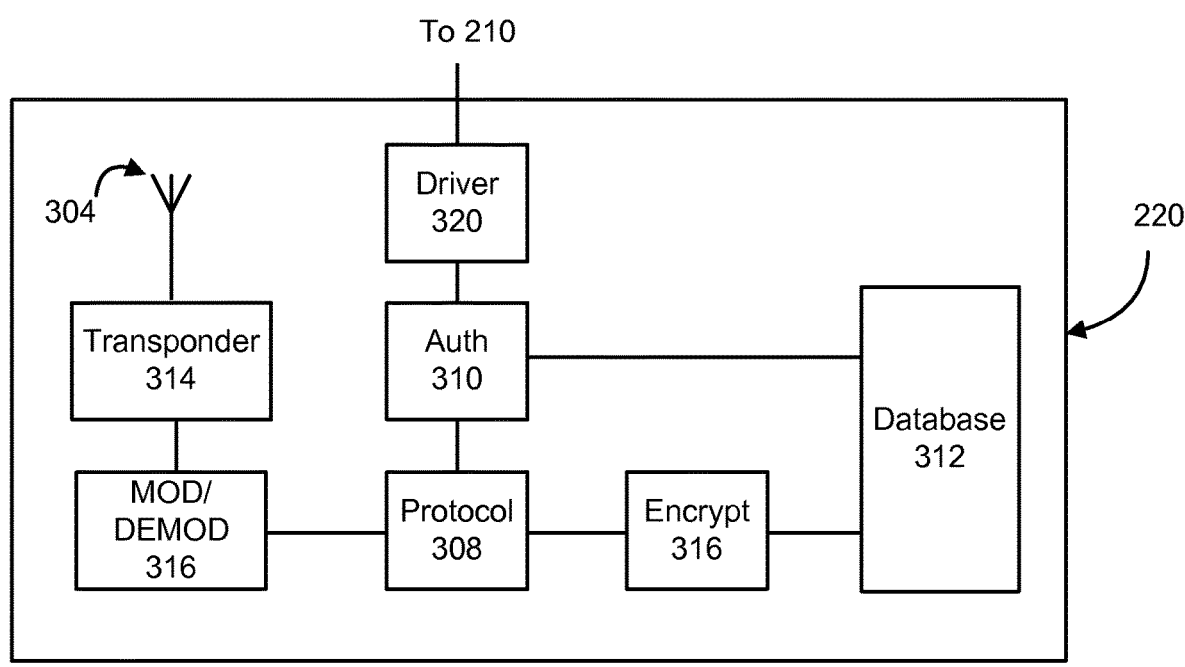
FIG. 3 shows a block diagram of exemplary RF module.

FIG. 3 shows a block diagram of exemplary RF module 220. The module 220 may include any conventional RF circuitry capable of communicating using Radio Frequency (RF) transmission. The module 220 may also be electrically connected to receive inputs from the display area 210 using a suitable display driver 320. The RF module 220 may include an antenna 304 for receiving an interrogation signal from RFID reader 106 via antenna 107. The antenna 304 may be in communication with a transponder 314. The transponder 314 may be a 13.56 MHz transponder compliant with the ISO/IEC 14443 standard, and the antenna 304 may be of the 13 MHz variety.

The transponder 314 may be in communication with a transponder compatible modulator/demodulator 306 configured to receive the signal from the transponder 314 and configured to modulate the signal into a format readable by any later connected circuitry. Further, the modulator/demodulator 306 may be configured to format (e.g., demodulate) a signal received from the later connected circuitry in a format compatible with the transponder 314 for transmitting to the reader 106 via the antenna 304. For example, where the transponder 314 is of the 13.56 MHz variety, the modulator/demodulator 306 may be ISO/IEC 14443-2 compliant.

The modulator/demodulator 306 may be coupled to a protocol/sequence controller 308 for facilitating control of the authentication of the signal provided by the reader 106, and for facilitating control of the sending of the module 220 account number. In this regard, protocol/sequence controller 308 may be any suitable digital or logic driven circuitry capable of facilitating determination of the sequence of operation for the module 220 inner-circuitry. For example, protocol/sequence controller 308 may be configured to determine whether the signal provided by the reader 106 is authenticated, and thereby providing to the reader 106 the account number stored on module 220.

To authenticate the signal, the protocol/sequence controller 308 may be further in communication with authentication circuitry 310 for facilitating authentication of the signal provided by the reader 106. Similarly, the authentication circuitry 310 may facilitate the sending and receipt of information to and from the display area 210 through the display driver 320. The authentication circuitry may be further in communication with a non-volatile secure memory database 312. Secure memory database 312 may be any suitable elementary file system such as that defined by ISO/IEC 7816-4 or any other elementary file system allowing a lookup of data to be interpreted by the application on the chip. The database 312 may be any type of database, such as relational, hierarchical, object-oriented, and/or the like. The database 312 may be organized in any suitable manner, including as data tables or lookup tables.

Association of certain data in the database 312 may be accomplished either manually or automatically. Automatic association techniques may include, for example, a database search, a database merge, GREP, AGREP, SQL, and/or the like. The association may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged based on the class data in the key field. The data corresponding to the key field in each of the merged data tables may be the same. However, data tables having similar, though not identical, data in the key fields may also be merged by using AGREP, for example.

The data received from the reader 106 or the database 312 may be used by the protocol/sequence controller 308 for data analysis and used for management and control purposes, as well as security purposes. The authentication circuitry 316 may authenticate the signal provided by reader 106 by association of the signal to authentication keys stored on database 312. The authentication circuitry 316 may be in further communication with encryption circuitry 316 which may encrypt or decrypt the reader 106 signal or the data (e.g., account number, user identifier, device identifier, etc.) returned from the database 312 prior to transmitting the data. The encryption circuitry 316 may use keys stored on the database 312 to perform encryption and/or decryption of signals sent to or from the RFID reader 106.

In addition, the protocol/sequence controller 308 may be in communication with the database 312 for storing at least one of module 220 account data, a unique module identification code, user identification code, or transaction device identifier, etc. The protocol/sequence controller 308 may be configured to retrieve the account number from database 312 as desired. The account data and/or unique device identification code stored on the database 312 may be encrypted prior to storage.

Thus, where the protocol/sequence controller 308 retrieves the account data, and or unique transaction device identifier, or the like, from the database 312, the data may be encrypted by the encryption circuit 316 when being provided to reader 106. Further, the data stored on the database 312 may include, for example, an unencrypted unique module 220 identification code, a user identification ISO/IEC, Track 1/2/3 data, as well as specific application applets. The data may additionally be stored in the database 312 in Track 1/Track 2/Track 3 format and may also be in Track 1/Track 2/Track 3 format when provided to the reader 106

In an exemplary operation, the module 220 is placed in proximity to, or physically on, the reader 106 when the user wishes to conduct a transaction. The user simply positions the module 220 at a certain distance from the reader 106 until the reader 106 acknowledges that the information contained in the module 220 has been received. The reader 106 then utilizes at least a portion of the information provided by module 220 (such as, a user's account number associated with the transaction device) to complete the transaction. The reader 106 may receive the account information from the module 220 and verify the account information authenticity prior to forwarding the account information to the transaction processor 108.

Inputs may be received in the display area 210 and interpreted by the display driver 320, as noted above. The inputs may be input to the authentication circuit 310 and the protocol/sequence controller 308 configured to send and receive information to and from the display area 210 to the modulator/demodulator 306 and the antenna 304 to allow a user to interact with the card 102 during a transaction. The interaction may allow the user to perform a transaction at the ATM/POS 105 (or other point of sale device) to withdraw cash, pay for goods and services, etc., using the card 102.

The embossed card number 230 may be a conventional raised card number and may be optional. Having the embossed card number 230 allows the card to be used as a conventional credit/debit/ATM card where a merchant can verify the card number with magnetic swipe information at the point of sale.

The network interface 240 may implement one or more connections standards. Examples include IEEE 802.11 series, Bluetooth, IEEE 802.16 series, among others. Further examples of communication standards are Global System for Mobile Communications (GSM) network, an Internet Protocol (IP) network, a Wireless Application Protocol (WAP) network, a WiFi network, or local area network (LAN), BLUETOOTH, as well as various combinations thereof. Other conventional and/or later developed wired and wireless networks may also be used. The network interface may utilize components within the RF module 220 to link to an external wireless network infrastructure.

The battery 250, if provided, may be comprised of a monolithic electrochemical cell having a lithium-containing cathode, a carbon anode, and a porous polymer separator infused with electrolyte solution. The cell has a thickness of less than 0.7 mm, such that it fits within the card 102.

Figure 4:
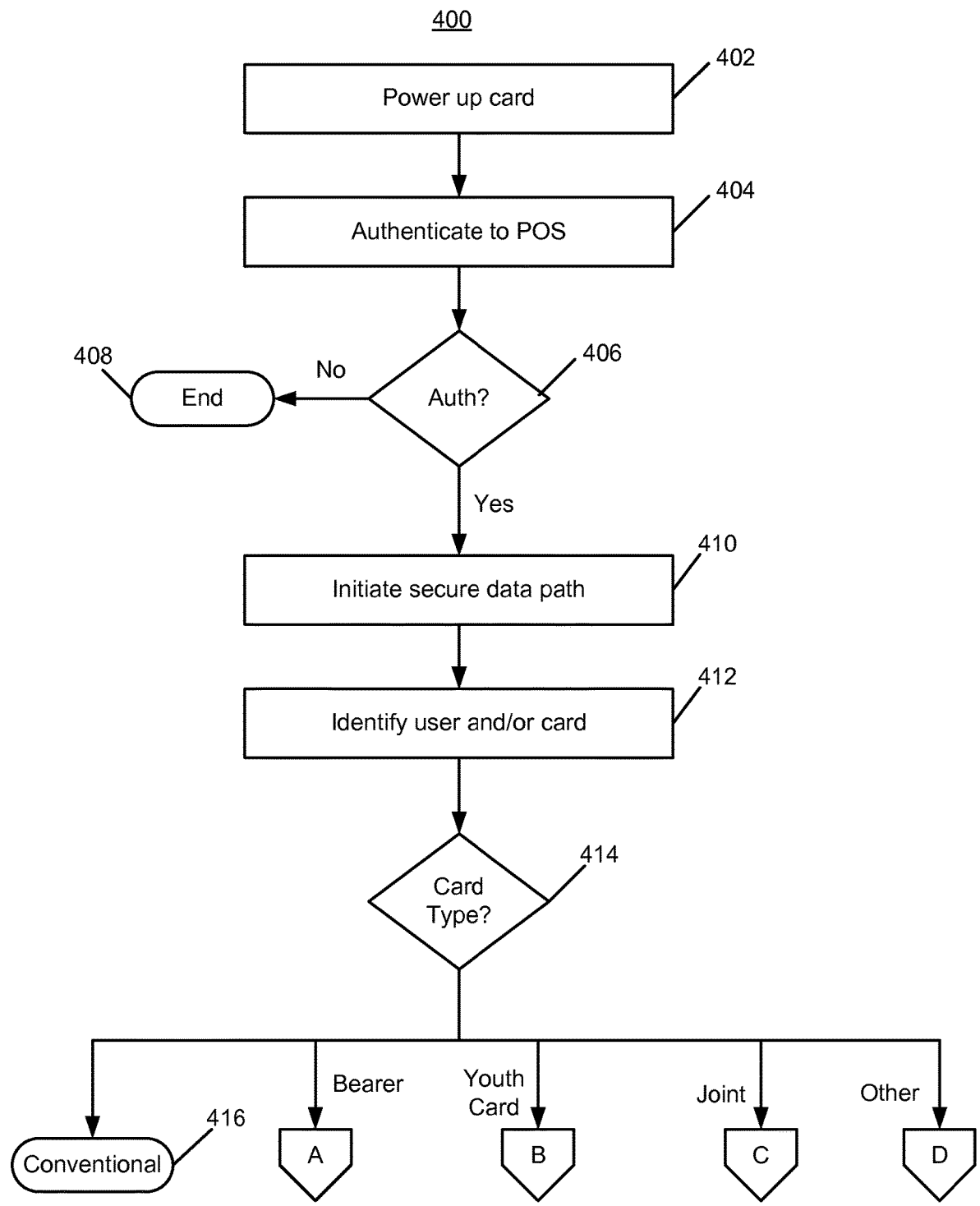
FIG. 4 shows an example process for conducting a transaction at an ATM/POS device using the card of FIG. 2.

FIG. 4 shows an example process 400 for conducting a transaction at an ATM/POS device 105 using the card 102. At 402, the card is powered-up. The card 102 may be brought into proximity to the reader 106 or placed on top of the reader 106 to induce a current within the card 102 to power up the internal circuitry. In some implementations, if the card 102 includes a battery 250, the card 102 may be powered up through user action.

At 404, the card authenticates to the ATM/POS. Information within the database 312 may be communicated to the reader 106 to authenticate the card with the ATM/POS 105. For example, a card identifier, a financial institution identifier, an account number, etc., may be communicated to the reader 106 by the RF module 220 in the card 102. The ATM/POS 105 may receive information from the card 102 to determine if the card 102 can continue communications with the ATM/POS 105. In some implementations, the user may enter a PIN number, pass phrase, username/password, etc., into the card 102 through the touch screen display area 210 in addition or alternatively to the above.

At 406, it is determined if the card has authenticated to the ATM/POS 105. If the authentication fails, then at 408 the process ends. If the authentication is successful, then at 410, a secure transmission path 124 between the card 102 and a financial institution (e.g. 116a) is established. As noted above, the secure transmission path 124 may be a separate communications that between the card 102 and the financial institution 116a outside conventional ATM network.

Figure 9:
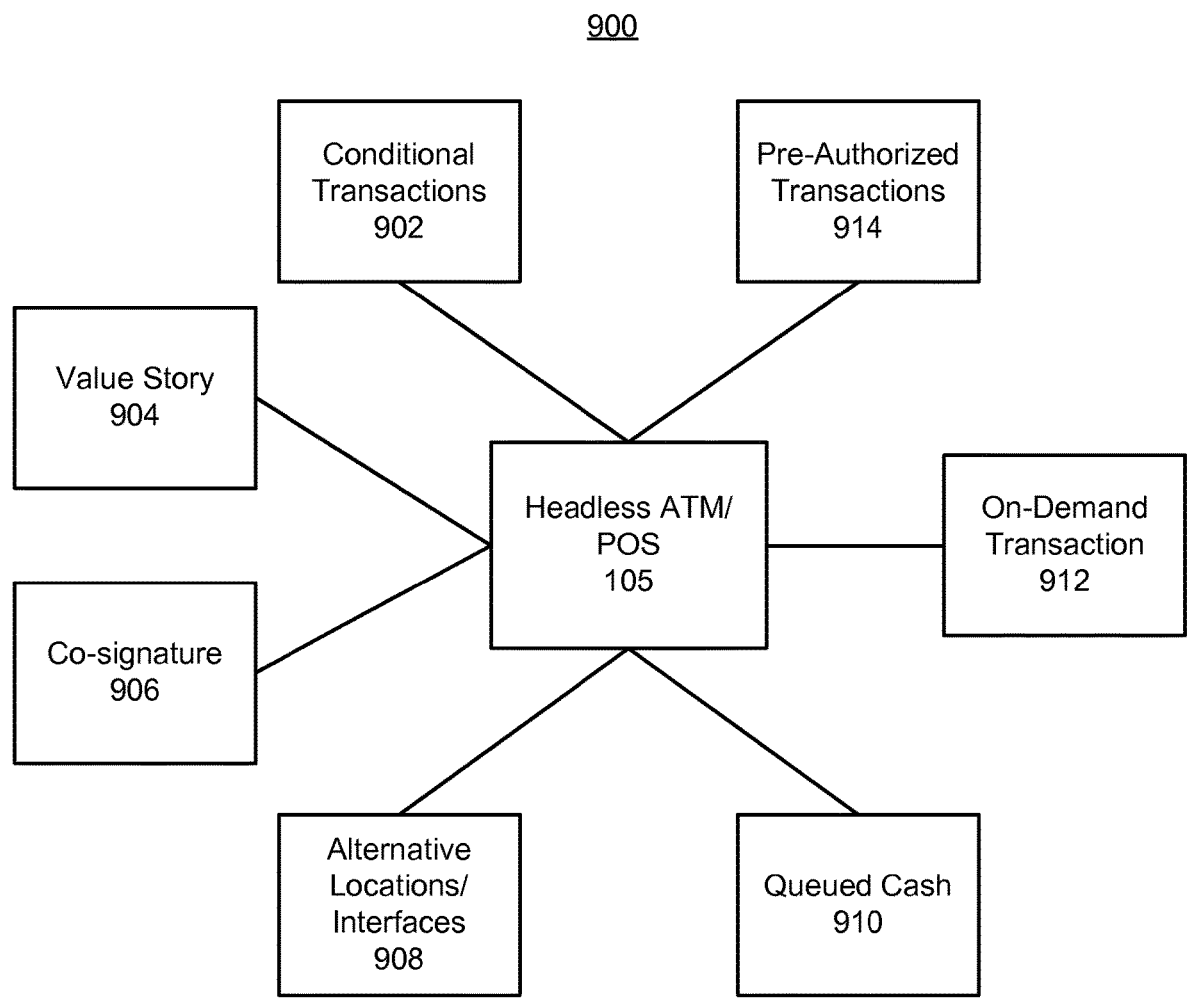
FIG. 9 illustrates exemplary transaction types that may be implemented in the system of FIG. 1 using the ATM/POS and the card of FIG. 2.

At 412, the user and/or card is identified. The user may enter a pin number, pass phrase, username/password, etc., into the card 102 through the touch screen display area 210 to identify the user and/or card with the financial institution 116a. In accordance with the identification and 412, a card type may be determined at 414. For example, the card 102 may have a predefined configuration, such as a conventional credit/debit/ATM card, a bearer card, a youth card, a joint account card, or other. It is noted that the types of cards illustrated in FIG. 4 are merely for exemplary purposes and should not be construed as limiting the type(s) of configurations the card 102 may have. FIG. 9 illustrates additional non-limiting uses and types configurations that may be assigned to the card 102.

If at 416, is determined at the card 102 is configured as conventional credit/debit/ATM card, then the card may be processed by a merchant 101 or conventional ATM in a conventional fashion.

Figure 5:
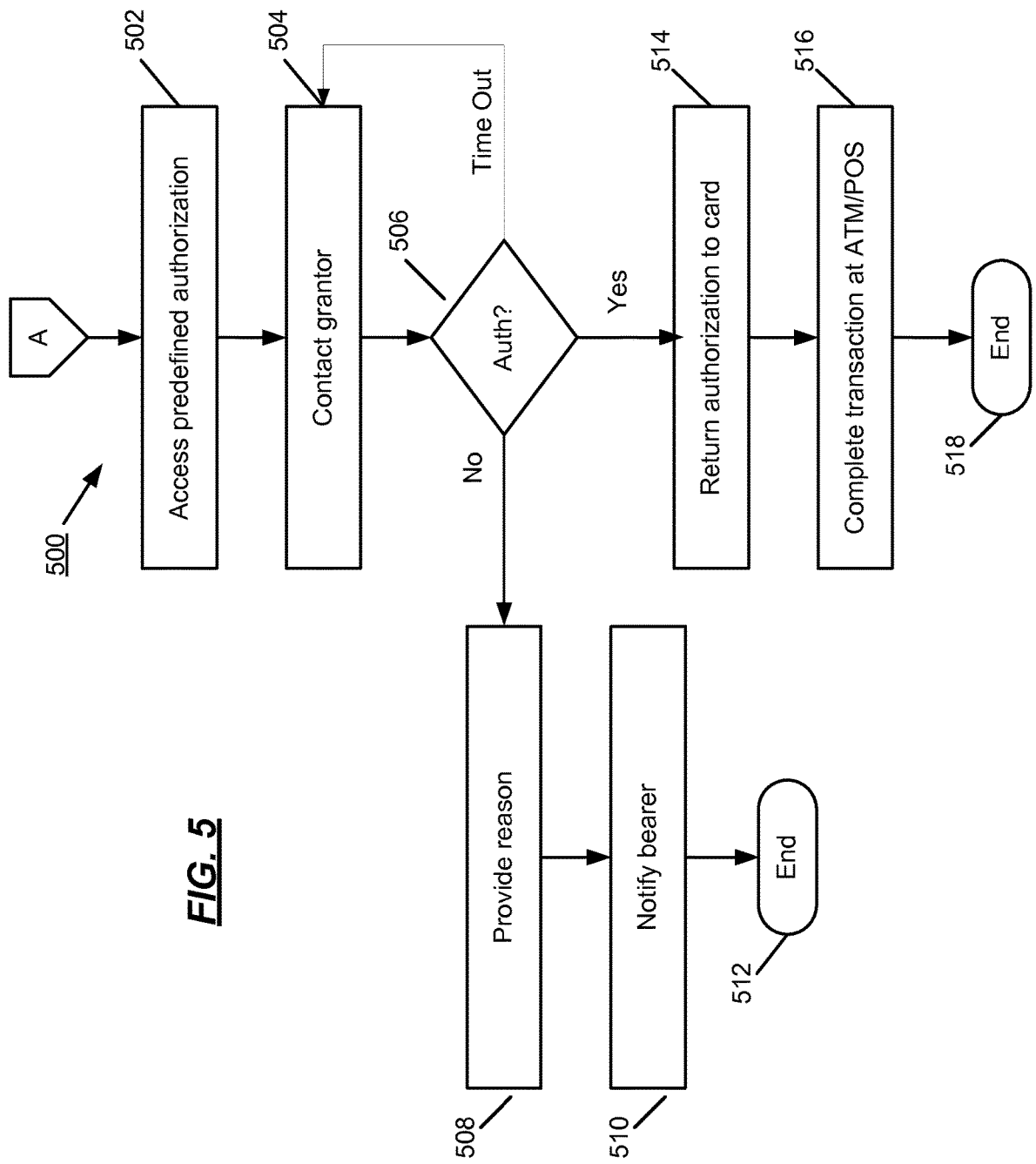
FIG. 5, which illustrates an example operational flow for processing the card of FIG. 2 as a bearer card.

If at 416, the card type is determined to be a bearer card, the process continues as shown in FIG. 5, which illustrates an example operational flow 500 for processing the card 102 as a bearer card. In accordance with implementations herein, the bearer card acts like cash instrument may be used by the cardholder to withdraw a predetermined amount of funds from the ATM/POS 105. This may be a single-transaction or one-time-use-only card that has specific purposing such as, "dispense $100 from ATM #43 at the corner of Market and Main streets when it is presented to the device. This could also be done in affiliation with businesses that the financial institution 116a has an alliance with, such as retail merchants, other banks, convenience stores, universities, etc where no ATM devices are located but where cash could be dispensed where point-of-sale checkout stands or merchant customer service offices exist. Such an alliance would allow for single-purpose cards to be used across a wide variety of locations, extending the number of potential cash dispensing locations.

At 502, a predefined authorization for card 102 is accessed. The authorization may have been defined by the grantor (e.g. an account holder at the financial institution 116a have an account to which the card 102 is linked) by accessing a website, contacting call center, etc. of the financial institution 116a to prearrange the authorization/configuration of card 102. The authorization may specify terms, conditions, the amount of funds, a schedule for dispersing funds, etc. to the bearer of the card 102.

At 504, the grantor is contacted. The financial institution 116a may receive a communication from the card 102 using the interface 240 and the secure transmission path 124 to ascertain an authorization for the bearer to make a withdrawal of funds using the card 102. The grantor may be contacted by the financial institution 116a by electronic messaging (e.g., an SMS message, e-mail) or telephonically. At 506, is determined if an authorization has been received from the grantor. If the financial institution 116a was unable to contact the grantor, the financial institution 116a may wait a predetermined amount of time and try again. The financial institution 116a may contact the grantor up to a predetermined number of tries. If no authorization has been received after the predetermined number of tries has been attempted, then at 506 it is determined that no authorization has been given by the grantor. At 506, it may be determined that the grantor has affirmatively denied an authorization to card 102, where the process continues at 508 and a reason may be provided by the grantor (e.g., "the work was not completed satisfactorily," etc.).

At 510, the bearer is notified over the secure transmission path 124. The bearer may be notified in the display area 210 of the card 102. The reason may scroll or ask the bearer to touch the display to read through additional information across the display area 210 and may provide suggestions to the bearer to rectify the reason for the denial. The process then ends at 512.

If at 506, an authorization was received from the grantor, then at 514 the authorization is returned to the card 102. The authorization may be returned to the card over the secure transmission path 124 and enables the card 102 to complete the transaction at the ATM/POS 105 at 516. The transaction may be completed by dispensing funds to the bearer in the amount determined by the predefined authorization at 502. At 518, the process ends. Thus, for example, a contractor may be able to use the card 102 to dispense funds in an amount to cover supplies for a job. Later, the contractor may use the card 102 to dispense funds and an amount agreed upon with the customer as payment for a milestone.

Figure 6:
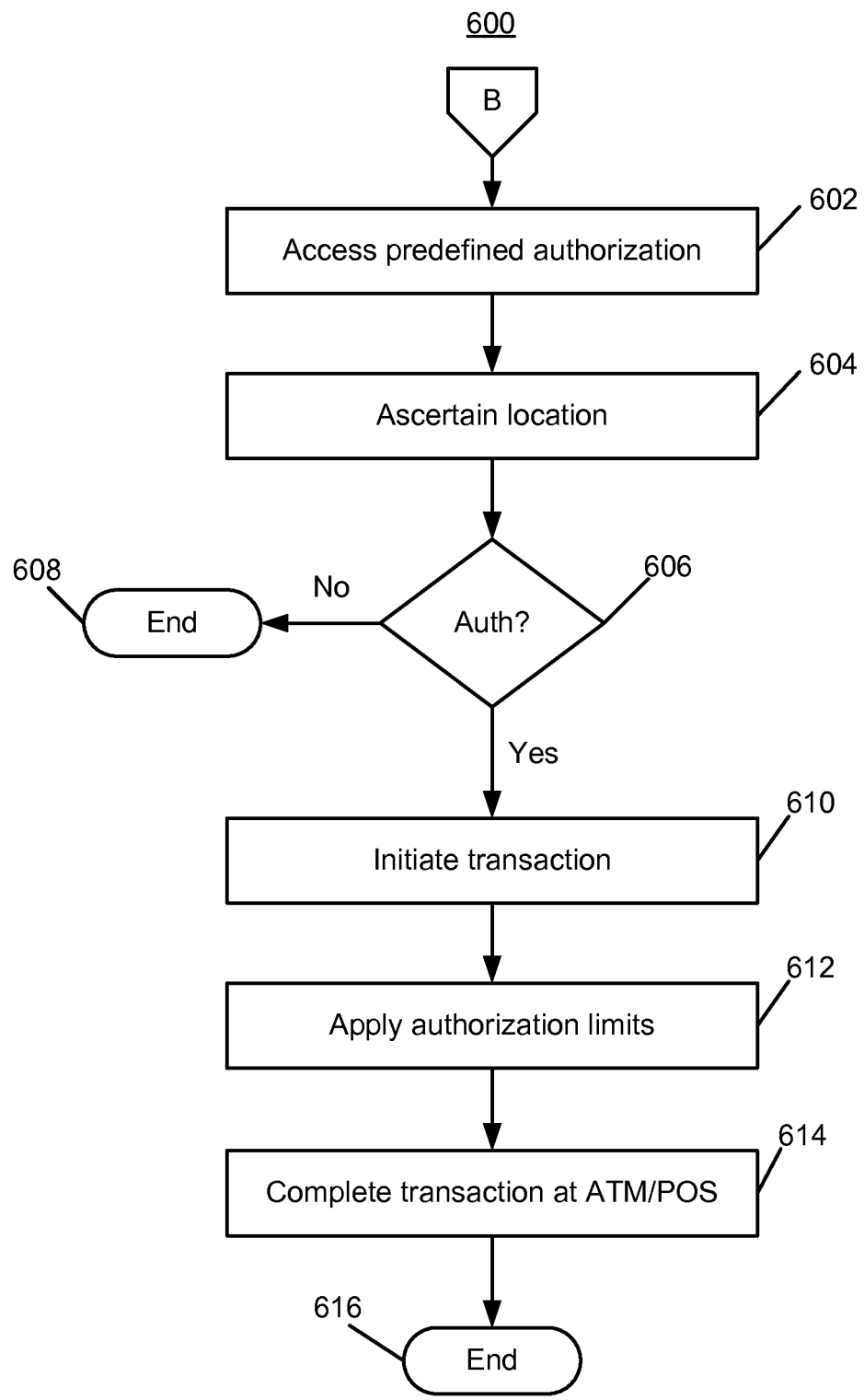
FIG. 6, which is an example operational flow of processing the card of FIG. 2 as a youth card.

Returning to FIG. 4, if it is determined at 414 the card type is a youth card, then processing continues at as shown in FIG. 6, which is an example operational flow 600 of processing the card 102 as a youth card. At 602, a predefined authorization for card 102 is accessed. The authorization may have been defined by the grantor (e.g. an account holder at the financial institution 116*a* have an account to which the card 102 is linked) by accessing a website, contacting call center, etc. of the financial institution 116*a* to prearrange the authorization/configuration of the card 102. The authorization may specify terms, conditions, the amount of funds, a schedule for dispersing funds, etc. to a youth bearing the card 102.

At 604, a location of the card is ascertained. The location of the card 102 may be ascertained by determining the location the ATM/POS 105 that the card 102 has authenticated to in 404. The geographic location of the ATM/POS 105 may be stored in a database accessible to the financial institution 116*a*, the card 102 may be located using GPS or trilateration techniques (over the secure transmission path 124), or the location provided by the cardholder.

At 606, it is determined if the card 102 is authorized to make a transaction based on the geographic location and the predefined authorization retrieved at 602. For example, in some implementations, the youth card may be "geo-fenced" such that it may be operable to make a transaction only within a certain geographic area (e.g. an ATM/POS 105 on a school campus). If the card is not authorized to make the transaction, the process ends at 608. If the card is authorized to make the transaction, then, at 610, the transaction is initiated.

At 612, authorization limits are applied to the transaction initiated at 610. For example in addition to the geo-fenced area in which the card 102 may be operable, a withdrawal amount may be limited (e.g., limited to $20/day). In addition, the card 102 may be limited such that transfers between accounts is not allowed. Many such limitations are possible in view of the flexible nature of the card 102.

At 614, the transaction is completed at the ATM/POS 105. Transaction may be completed by dispensing funds to the youth bearing the card a 102 and the process ends at 616.

Figure 7:
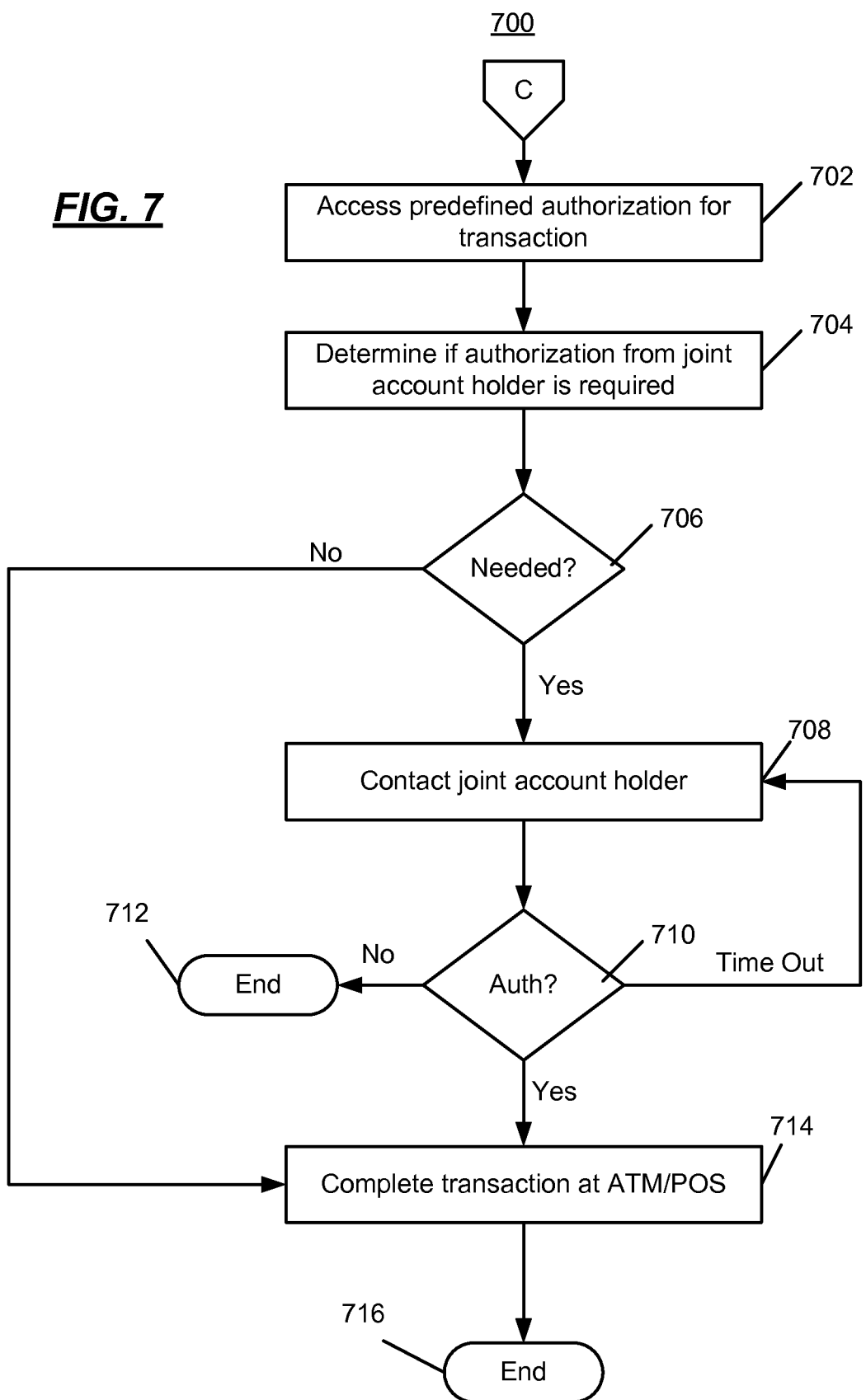
FIG. 7, which is an example operational flow of processing the card of FIG. 2 as a joint account card.

Returning to FIG. 4, if it is determined at 414 that the card type is a joint account card, then processing continues at as shown in FIG. 7, which is an example operational flow 700 of processing the card 102. At 702, a predefined authorization for a transaction associated with the card 102 is accessed. The authorization may have been defined by the joint account holders (e.g. an account holder at the financial institution 116*a* have an account to which the card 102 is linked) by accessing a website, contacting call center, etc. of the financial institution 116*a* to prearrange the authorization/configuration of the card 102. The authorization may specify terms, conditions, the amount of funds, a schedule for dispersing funds, etc. to a single one of the account holders bearing the card 102.

At 704, is determine if an authorization from the joint account holder is required based on the transaction to be completed at 702. If, at 706, an authorization is not needed, then at the process flow continues to 714 where the cardholder completes the transaction at the ATM/POS 105 using the card 102. However, if an authorization is needed at 706, then at 708, the joint account holder is contacted via the secure transmission path 124 and the financial institution 116*a*.

At 708, is determined if an authorization has been received from the joint account holder. If the financial institution 116*a* was unable to contact the joint account holder, the financial institution 116*a* may wait a predetermined amount of time and try again. The financial institution 116*a* may contact the joint account holder up to a predetermined number of tries. If no authorization has been received after the predetermined number of tries has been attempted, then at 710 it is determined that no authorization has been given by the joint account holder and the process ends at 712. At 710, it also may be determined at the joint account holder has affirmatively denied an authorization to card 102 and the process ends at 712.

If the joint account holder authorizes the transaction 710, the authorization may be communicated over the secure transmission link 126 and the transaction is completed at the ATM/POS 105 at 714. The transaction may be completed by dispensing funds to the joint account holder bearing the card 102, or transferring funds, etc., as specified at 702. The process ends at 716. It could also be the case that two cards had to be presented together to the same ATM/POS device for the funds to be dispensed. This would provide a high level of security where both parties had to be physically present for the funds to be dispensed.

Figure 8:
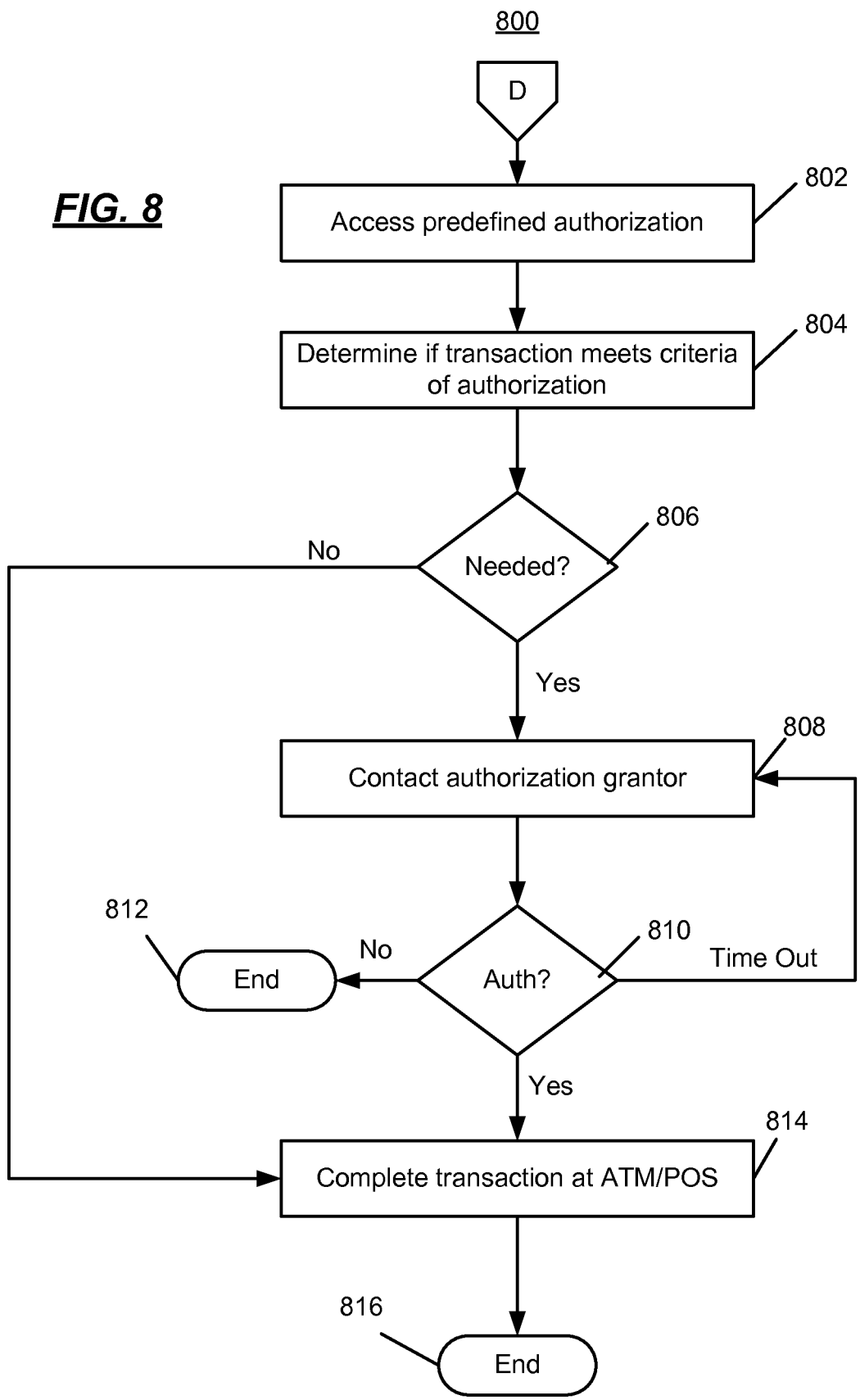
FIG. 8, which is an example operational flow of processing the card of FIG. 2 as configured generally.

Returning to FIG. 4, if it is determined at 414 that the card type is "other," then processing continues at as shown in FIG. 8, which is an example operational flow 800 of processing the card 102. The operational flow 800, is provided as a generic overview of processing which may be applied to many different types of transactions in accordance to the configuration of the card 102. Many such non-limiting configurations are provided in FIG. 9 below.

At 802, a predefined authorization for a transaction associated with the card 102 is accessed. The authorization may have been defined by an account holder at the financial institution 116*a* having an account to which the card 102 is linked. The account holder may predefine and configure the card 102 by accessing a website, contacting call center, etc. of the financial institution 116*a*. The authorization may specify terms, conditions, the amount of funds, a schedule for dispersing funds, etc. to a single one of the account holders bearing the card 102.

At 804, is determined if the transaction to be completed at 802 meets the criteria of the authorization. For example, the transaction may involve one or more of the terms, conditions, the amount of funds, schedule, etc. set forth by the account holder. If at 806 an authorization is not needed, then at the process flow continues to 814 where the cardholder completes the transaction at the ATM/POS 105 using the card 102. However, if an authorization is needed at 806, then at 808 the account holder is contacted via the secure transmission path 124 and the financial institution 116*a*.

At 808, is determined if an authorization has been received from the account holder. If the financial institution 116*a* was unable to contact the account holder, the financial institution 116*a* may wait a predetermined amount of time and try again. The financial institution 116*a* may contact the account holder up to a predetermined number of tries. If no authorization has been received after the predetermined number of tries has been attempted, then at 810 it is determined that no authorization has been given by the account holder and the process ends at 812. At 810, it also may be determined that the account holder has affirmatively denied an authorization to card 102 and the process ends at 812.

If the account holder authorizes the transaction 810, the transaction is completed at the ATM/POS 105 at 814. The transaction may be completed by dispensing funds to the person bearing the card 102, or transferring funds, printing tickets, receiving deposits, paying bills, etc. The process ends at 816.

FIG. 9 illustrates exemplary transaction types that may be implemented in the system 100 using the headless ATM/POS 105 and the card 102. As illustrated in FIG. 9, such exemplary transaction types may include conditional transactions 902, value story transactions 904, co-signature transactions 906, alternative locations/interface transactions 908, queued cash transactions 910, on-demand transaction 912, and preauthorized transactions 914.

The conditional transactions 902 may include preset transactions based on triggering events. For example, such transactions may include receipt of a retailer coupon, receipt of funds from another source (e.g., rewards funds issued in "store currency" or "financial institution reward currency" that may be used for specific types of purchases, such as in a particular store, or using a particular card 102), and certain particular transactions (e.g., a specific transaction at specific locations). "Store currency" or "financial institution reward currency" may include incentives where purchases made at a merchant 101 or through a financial institution website may completed using an artificially-valued currency (e.g., $50 charged at a Big Electronics Store POS device yields $60 of Big Electronics Store dollars to make a purchase of electronic equipment from the store. Similarly, a $50 purchase on Bank website results in buying power of, e.g., $75 in Bank dollars to make purchases on the Bank website). The conditional transactions 902 may also include preset transactions based on dates and/or times. For example, conditional transactions may be cash transactions to a housekeeper or other service provider who utilizes the card 102 to withdraw cash as payment for services rendered. The "store currency" amounts could be stored on the card issuers authorization systems to allow for the "currency" to be retained in the case of a card needing to be replaced due to damage or theft. It would also be possible to exchange one currency for another at a conversion rate negotiated by the currency issuers. For example, $50 Big Electronics Store currency credits could be exchanged for $25 of Popular Restaurant Chain currency credits. This allows for merchants to establish secondary purchasing patterns and value exchanges between themselves.

Value story transactions 904 include transactions that take advantage of certain aspects of the flexible nature of the card 102. A replacement card 102 may be provided and activated for use by the customer immediately without waiting for a new ATM card to be processed and delivered. The card 102 may be acquired from any merchant 101 or financial institution 116*a-n*, and activated for use by the customer. The card 102 may provide convenience aspects such as an ATM/POS 105 where no ATM may presently exist. The customer may go to a merchant 101 having an ATM/POS 105 and make a withdrawal within the system 100, whereas conventionally the merchant 101 would likely not have a conventional ATM machine on premises. In addition, the card 102 may provide access to emergency funds as device institution 116*a* may authorize the card 102 to access emergency funds that would otherwise not be accessible.

Social networking aspects are possible, such as merchant feedback about a purchase that may be provided using the card 102. The card 102 may be used to prevent price gouging. For example, the card 102 may be presented to make a purchase from vendor X. During the transaction, information may be displayed in the display 210 that the price is too high, and that vendor Y is selling the same product for 50% less.

Co-signature transactions 906 may include transactions by a first account holder that a second account holder authorizes. Such co-signature transactions 906 may be useful to businesses, etc., to authorize withdrawals over a threshold amount, approval of funds transfers to outside accounts, and authorizing payments to vendors to ensure that only legitimate vendors receive funds from the account tied to the card 102.

Alternative locations/interfaces 908 are transactions whereby a customer approaches an ATM/POS 105 and begins a communication session therewith. The ATM/POS 105 may suggest a different ATM/POS 105 having different capabilities to complete a requested transaction and/or the ATM/POS 105 may reconfigure its interface to a format more appropriate for the customer and order the card a 102. For example, a disabled customer may be unable to access an ATM/POS 105. Using the RF module 220, the card 102 may communicate with the reader 106 whereby be ATM/POS 105 may suggest an accessible ATM/POS 105 in a different location. In some implementations, the card 102 may be provided with capabilities whereby additional functionalities are provided if in contact with a surface computing device. The ATM/POS 105 may reconfigure its interface from an RF-based interface to a surface-based interface in order to provide maximum capabilities to the customer carrying the card 102.

Queued cash transactions 910 are transactions where a customer is preauthorized to obtain certain features and benefits. The card 102 may be a vehicle for authentication of the customer at retailers, financial institutions, travel destinations, etc., whereby the customer is provided a higher-level service, passes for events, discounts, or any other benefit that may be bestowed upon the customer in accordance with a particular location.

On-demand transactions 912 are transactions that are specific to a merchant 101 and/or the ATM/POS 105. On-demand transactions 912 may only be completed at the merchant 101 or the ATM/POS 105, and may be requested for security purposes, transferring funds to a specific person, etc. For example, the card 102 may be used as a meal plan card at State University, etc.

Preauthorized transactions 914 may include transactions based on origination and/or transaction and security measures. Transactions based on origination may include those initiated by an account holder, initiated by recipient, or set up at a personal computer and/or a mobile device prior to taking place. Transactions based on security measures may be those having a specific time to live duration, having a specific location or boundary of locations, having a pre-shared key arranged in advance or through and out of band notification (e.g., an SMS message, e-mail, etc.), and those paired to specific mobile device associated with a person or persons. In some implementations, a one-time PIN may be created for a specific transaction in order to prevent fraudulent use of the card 102.

Thus, the system 100 including the card 102 and the ATM/POS 105 may have many expandable uses in combination with the above described operational flows, or in related operational flows.

Figure 10:
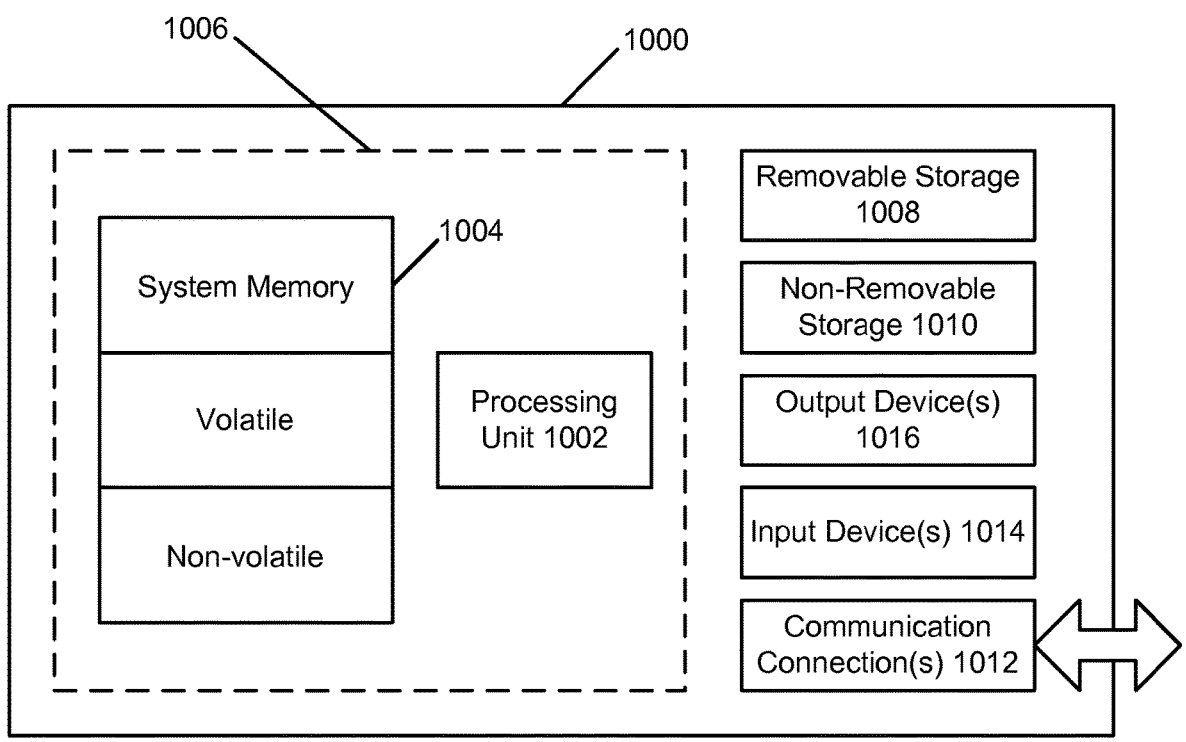
FIG. 10 is a block diagram of an example computing environment that may be used in connection with implementations of the subject matter described herein.

The subject matter described herein may be implemented through the use of a computer system, or other type of device that has some computing mechanism(s). FIG. 10 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an example system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by computing device 1000 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 1004, removable storage 1008, and non-removable storage 1010 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may also contain communications connection(s) 1012 that allow the device to communicate with other devices. Communications connection(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 1000 may also have input device(s) 1014 such as keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

What is claimed:

1. A computer-implemented method comprising:
providing, using a first communication path, authentication information from a user device to a machine, wherein the user device comprises a card;
after the user device is authenticated, receiving transaction information for the transaction from the machine using the first communication path;
establishing a second communication path using a network interface of the card;
after receiving, by the user device and through a display of the user device, an indication that confirms the transaction information, providing, by the user device, the transaction information and identification information to a financial institution via the second communication path between the user device and the financial institution;
responsive to determining that the user device is a youth card, determining a geographical location of the user device;
selectively providing authorization for the transaction based, at least in part, on the geographical location of the user device;
receiving, by the user device, an authorization for the transaction from the financial institution via the second communication path; and
in response to receiving the authorization from the financial institution, causing completion of the transaction at the machine using the first communication path.

2. The method of claim 1, further comprising:
after receiving the transaction information, displaying the transaction information on the display of the user device.

3. The method of claim 1, further comprising applying an authorization limit to the transaction.

4. The method of claim 1, further comprising creating a short range radio frequency (RF) communications link between the user device and the machine, the short range radio frequency (RF) communications link communicating data to and through the first communication path.

5. The method of claim 1, wherein the second communication path is a secure tunnel over a public network.

6. The method of claim 1, wherein characteristics of the user device are determined in advance of the transaction.

7. The method of claim 1, further comprising displaying, on the display of the user device, an indication that another vendor is offering a product involved in the transaction at a lower price.

8. A computer-implemented method comprising:
providing, using a first communication path, authentication information from a user device to a machine, wherein the user device comprises a card;
after the user device is authenticated, receiving transaction information for the transaction from the machine using the first communication path;
establishing a second communication path using a network interface of the card;
after receiving, by the user device and through a display of the user device, an indication that confirms the transaction information, providing, by the user device, the transaction information and identification information to a financial institution via the second communication path between the user device and the financial institution;
responsive to determining that the user device is a joint account card, determining, based on the transaction information, that authorization from a joint account holder is required for the transaction;
obtaining authorization for the transaction from the joint account holder;
receiving, by the user device, an authorization for the transaction from the financial institution via the second communication path; and
in response to receiving the authorization from the financial institution, causing completion of the transaction at the machine using the first communication path.

9. The method of claim 8, further comprising:
after receiving the transaction information, displaying the transaction information on the display of the user device.

10. The method of claim 8, further comprising creating a short range radio frequency (RF) communications link between the user device and the machine, the short range radio frequency (RF) communications link communicating data to and through the first communication path.

11. The method of claim 8, wherein the second communication path is a secure tunnel over a public network.

12. The method of claim 8, wherein characteristics of the user device are determined in advance of the transaction.

13. The method of claim 8, further comprising displaying, on the display of the user device, an indication that another vendor is offering a product involved in the transaction at a lower price.

14. A system comprising:
at least one processor; and a data store coupled to the at least one processor having instructions stored thereon which, when executed by the at least one processor, causes the at least one processor to perform operations comprising:
providing, using a first communication path, authentication information from a user device to a machine, wherein the user device comprises a card;
after the user device is authenticated, receiving transaction information for the transaction from the machine using the first communication path;
establishing a second communication path using a network interface of the card;
after receiving, by the user device and through a display of the user device, an indication that confirms the transaction information, providing, by the user device, the transaction information and identification information to a financial institution via the second communication path between the user device and the financial institution;
responsive to determining that the user device is a joint account card, determining, based on the transaction information, that authorization from a joint account holder is required for the transaction;
obtaining authorization for the transaction from the joint account holder;
receiving, by the user device, an authorization for the transaction from the financial institution via the second communication path; and
in response to receiving the authorization from the financial institution, causing completion of the transaction at the machine using the first communication path.

15. The system of claim 14, the operations further comprising:
 after receiving the transaction information, displaying the transaction information on the display of the user device.

16. The system of claim 14, the operations further comprising creating a short range radio frequency (RF) communications link between the user device and the machine, the short range radio frequency (RF) communications link communicating data to and through the first communication path.

17. The system of claim 14, wherein the second communication path is a secure tunnel over a public network.

18. The system of claim 14, wherein characteristics of the user device are determined in advance of the transaction.

19. The system of claim 14, the operations further comprising displaying, on the display of the user device, an indication that another vendor is offering a product involved in the transaction at a lower price.

* * * * *